(No Model.) 2 Sheets—Sheet 1.

J. C. TUTT.
CORN POPPING MACHINE.

No. 463,878. Patented Nov. 24, 1891.

Witnesses:
Geo. Y. Thorpe.
Jno. L. Condron.

Inventor:
John C. Tutt.
By Higdon & Higdon,
Attys.

(No Model.) 2 Sheets—Sheet 2.

J. C. TUTT.
CORN POPPING MACHINE.

No. 463,878. Patented Nov. 24, 1891.

Witnesses:
Geo. M. Thorpe
Jno. L. Condron

Inventor:
John C. Tutt
By Higdon & Higdon,
Attys.

UNITED STATES PATENT OFFICE.

JOHN C. TUTT, OF GUTHRIE, OKLAHOMA TERRITORY.

CORN-POPPING MACHINE.

SPECIFICATION forming part of Letters Patent No. 463,878, dated November 24, 1891.

Application filed May 29, 1891. Serial No. 394,579. (No model.)

*To all whom it may concern:*

Be it known that I, JOHN C. TUTT, of Guthrie, Logan county, Oklahoma Territory, have invented certain new and useful Improvements in Corn-Popping Machines, of which the following is a full, clear, and exact description, reference being had to the accompanying drawings, forming a part hereof.

My invention relates to machines for popping corn; and the object of my invention is to produce a machine which shall be simple, durable, and inexpensive in construction, which shall thoroughly agitate the corn while it is being popped, and which shall automatically separate the unpopped corn from that which is popped.

To the above purposes my invention consists in certain peculiar and novel features of construction and arrangement, as hereinafter described.

In order that my invention may be fully understood, I will proceed to describe it with reference to the accompanying drawings, in which—

Figure 1:
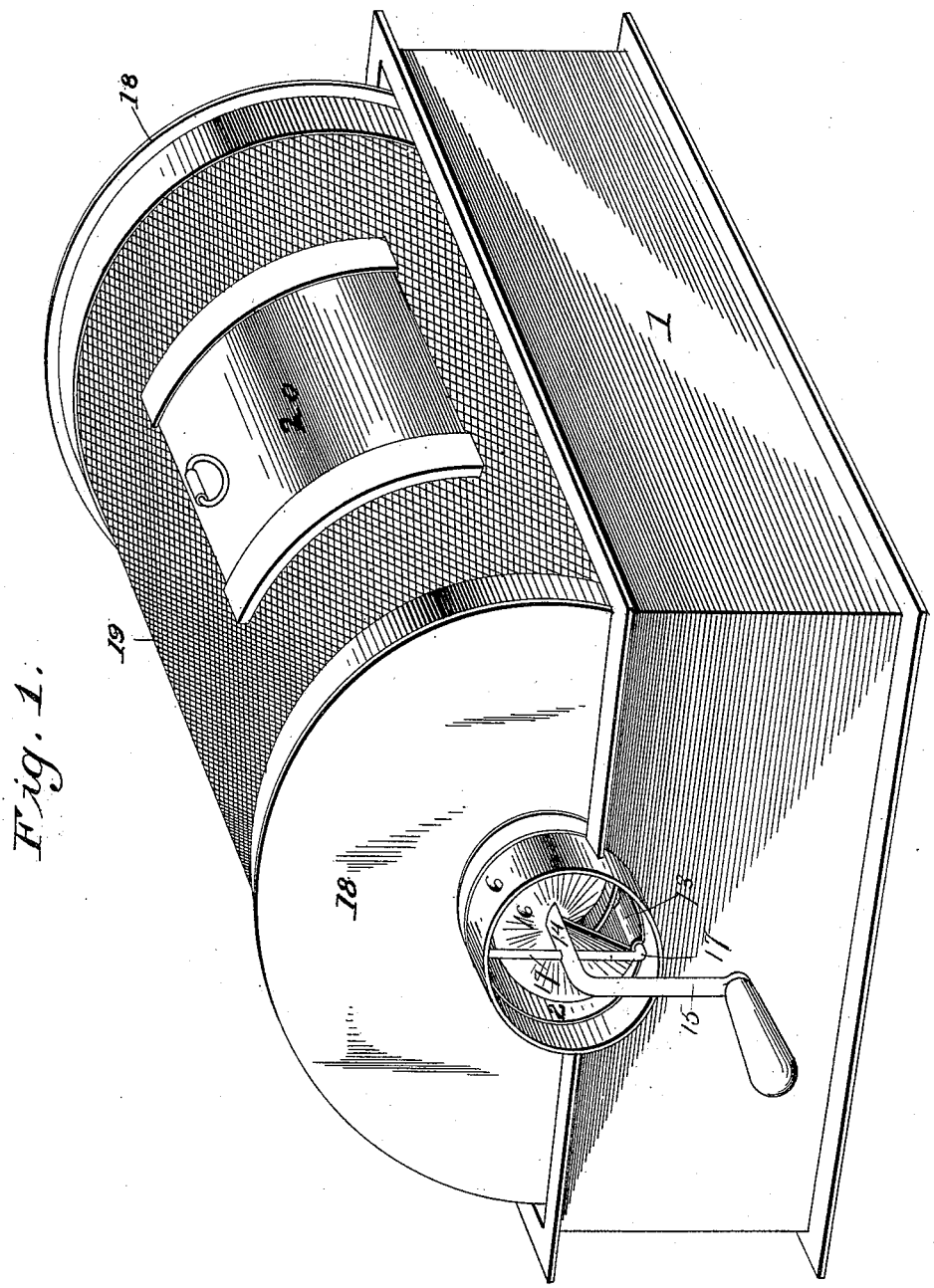
Figure 3:
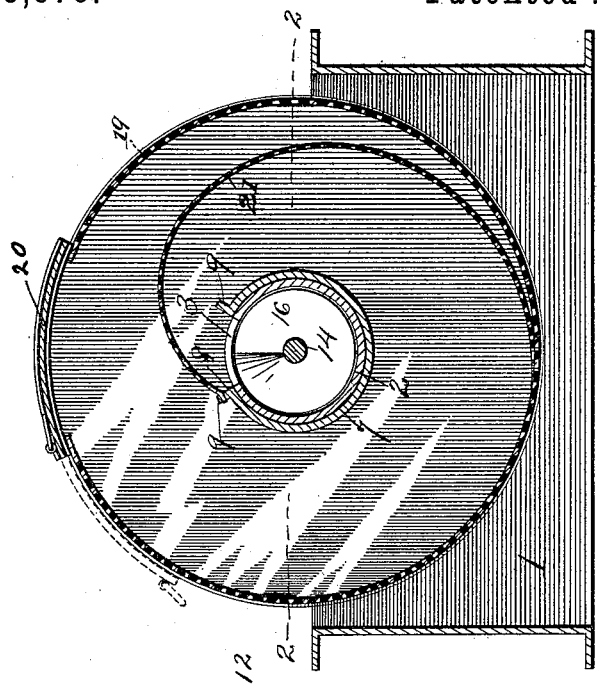
Figure 5:
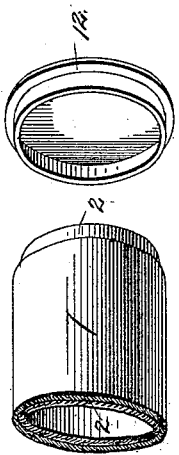
Figure 2:
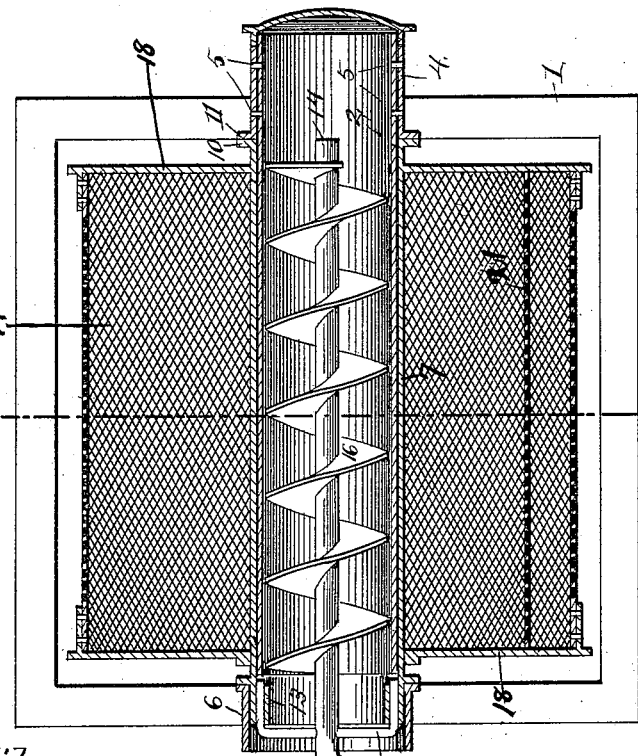
Figure 4:
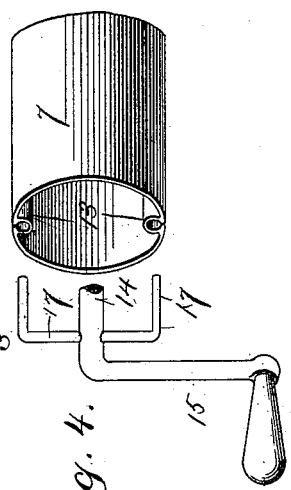

Figure 1 is a perspective view of a corn-popping machine embodying my invention. Fig. 2 is a central vertical longitudinal section of the same on the line 2 2 of Fig. 3. Fig. 3 is a transverse vertical section of the same on the line 3 3 of Fig. 2. Fig. 4 comprises a detached perspective view of the interior cylinder and an end portion of the operating crank-shaft with its connecting-arms. Fig. 5 comprises a detached perspective view of one end of the interior cylinder and its closing-cap.

In said drawings, 1 designates the supporting-casing of the machine, the said casing being preferably of sheet metal, and of rectangular form, and also intended to rest above or to receive any suitable or preferred form of heater. Extending horizontally across the upper part of the casing 1 is a cylindrical portion 2, in the upper side of which is formed a longitudinal opening 3. At one end this cylinder is rigidly secured to a circular support 4, rigidly mounted upon the upper part of the casing 1 at one end thereof, the end of the cylinder 2 being secured to the support by any suitable number of rivets 5 or equivalent devices. Upon the upper side of the opposite end of the casing 1 is rigidly secured a second circular bearing 6, into which extends one end of a revoluble cylinder 7, which surrounds the stationary cylinder 2, and which is formed with a longitudinal opening 8, the margins of which are provided with elongated flanges 9. The opposite end of the cylinder 7 is provided with a circular outwardly-extending flange 10, which lies in contact with a similar flange 11, on the inner end of the circular support 4 of the casing 1. Upon that end of the inner or stationary cylinder 2 which extends through the support 4 is placed a removable cap 12, and the inner surface of the opposite end of the revoluble cylinder 7 is provided with two oppositely-disposed sockets 13.

14 designates a shaft, which is removably inserted through the bearing 6, and which lies also within the stationary cylinder 2. At one end of this shaft carries a crank-arm 15, which projects out of the machine, and within the stationary cylinder 2 the shaft 14 carries a spiral conveyer 16. At its outer portion the shaft 14 carries a pair of oppositely-extending radial arms 17, the outer end of each of which extends inward at right angles from the body portion of the arm, and each of which inwardly-extending portions enters removably one of the sockets 13.

18 designates two disks, which are rigidly secured at their centers to opposite ends of the revoluble cylinder 7, and to the margins of which is secured a cylindrical mesh 19 of wire-cloth. This mesh is provided with an opening which is closed by a sliding door 20.

21 designates a spiral partition, which is also of wire meshing, and which extends from one disk 18 to the opposite disk 18, and the other end of which is secured to the inner surface of the cylindrical mesh 19. The opposite end of this partition is secured to one of the flanges 9 of the revoluble cylinder 7, and the partition extends spirally over the opening 8 of said cylinder.

In using the above machine the corn to be popped is poured into the machine through the opening, which is provided with the sliding door 20. The crank-handle 15 is now rotated, and the partition 21 tends to carry any unpopped corn into the inner stationary cylinder 2, wherein the unpopped corn is fed by the conveyer 16 out of the machine when the cap 12 is removed.

It will thus be seen that I have produced a simple, durable, and inexpensive form of popcorn machine, which can be easily operated, and which automatically separates the unpopped corn from that which has been popped.

Having thus described my invention, what I claim as new therein, and desire to secure by Letters Patent, is—

1. An improved corn-popping machine comprising a suitable base or casing, a fixed cylinder mounted upon the top of the machine-casing and provided with a longitudinal opening, a revoluble cylinder surrounding the fixed cylinder and also having a pair of internal sockets, and an actuating crank-shaft provided with a spiral conveyer, and also with two arms removably entering the sockets of the movable cylinder, substantially as set forth.

2. An improved corn-popping machine comprising a fixed and a movable cylinder, each provided with a longitudinal opening, the movable cylinder surrounding the fixed cylinder, a cap removably mounted upon one end of the fixed cylinder, and a spiral conveyer mounted within the fixed cylinder, substantially as set forth.

In testimony whereof I affix my signature in presence of two witnesses.

JOHN C. TUTT.

Witnesses:
   D. C. YOUNG,
   W. H. HENDRIX.